(No Model.)

W. P. TRACY.
ANTI-RATTLER FOR THILL COUPLINGS.

No. 416,973. Patented Dec. 10, 1889.

Witnesses.
W. P. Keene.
Frank L. Middleton.

Inventor.
Wm. P. Tracy.
by Ellis Green
Atty.

UNITED STATES PATENT OFFICE.

WILLIAM P. TRACY, OF GRAND RAPIDS, MICHIGAN.

ANTI-RATTLER FOR THILL-COUPLINGS.

SPECIFICATION forming part of Letters Patent No. 416,973, dated December 10, 1889.

Application filed October 30, 1889. Serial No. 328,672. (No model.)

*To all whom it may concern:*

Be it known that I, WILLIAM P. TRACY, of Grand Rapids, in the county of Kent and State of Michigan, have invented a new and useful Improvement in Anti-Rattlers for Thill-Couplings; and I do hereby declare that the following is a full, clear, and exact description of the same.

My invention is designed to prevent the rattling of the thills of carriages and wagons, and relates to that class in which a metal spring bears against the end of the thill.

Figure 1:
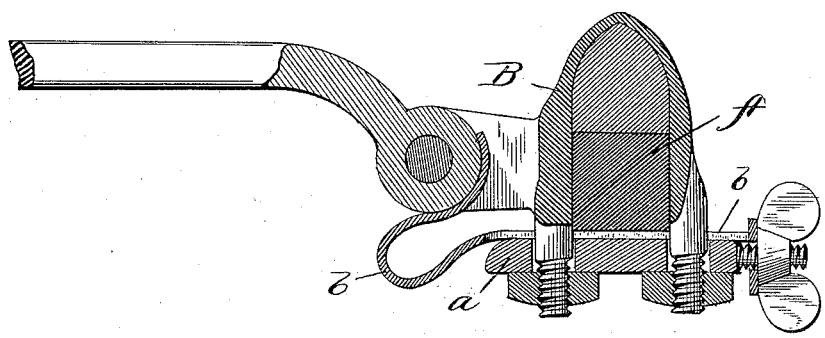
Figure 2:
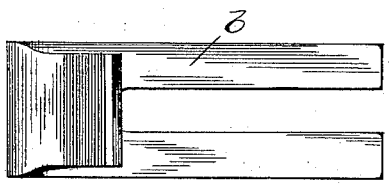

In the accompanying drawings, Figure 1 represents the invention in section, and Fig. 2 a plan view of the spring.

In the figures, the axle or cross-bar is shown at A, to which is secured the ordinary clip B, which carries the thill-coupling. This may be of ordinary construction, consisting of parallel lugs, between which the thill ends are held by means of a bolt passing through the thills and the lugs. The ends of the clip B are joined beneath the axle by means of a plate *a*, provided with openings through which the ends of the clip pass, these ends being screw-threaded, and the plate and clip held securely in place by means of nuts on the threaded ends of the clip. Between this plate *a* and the lower face of the axle is secured the spring-plate *b*, which has its forward end bent back upon itself and then upwardly behind the end of the thill, the curve of the spring conforming to the curve of the thill end and bearing against the same, so as to keep it close against the connecting-bolt, and thus prevent the rattling, which it is so desirable to overcome. This spring-plate is bifurcated throughout that portion which is clamped between the plate *a* and the axle, so that it may be adjusted without interfering with the ends of the clip, which pass through the bifurcated portion. Instead of adjusting the spring-plate by taking off the nuts from the ends of the clip and forcing the plate forward by simply the direct power of the fingers or by some implement, I provide means by which the plate may be adjusted without displacing the parts and without marring the ends of the plate, which would occur if an implement were used. The bifurcated end of the plate extends beyond the rear part of the plate *a*, and this plate is provided with a screw-threaded extension carrying the thumb-nut with an interposed washer, and this washer bears against the ends of the spring-plate, so that when it is desired to adjust the spring-plate it is only necessary to loosen the parts slightly and the power exerted by the thumb-nut will be found sufficient to advance the plate so as to put a greater pressure upon the ends of the thills.

I do not limit myself to the interposed washer, as the thumb-nut may be provided with a bearing sufficiently broad to act upon the ends of the plate directly.

I claim as my invention—

1. In combination with the thills of a wagon or a carriage, a spring-plate for preventing the rattling thereof, a clip forming part of the coupling, a plate connecting the ends of said clip, and adjusting means carried thereby, the spring-plate being held between the axle and the connecting-plate, substantially as described.

2. In combination with a clip forming part of the thill-coupling, a plate connecting the ends thereof beneath the axle, a spring-plate for preventing the rattling of the thill having its rear end bifurcated, a threaded extension projecting from the rear of the plate *a*, and a thumb-nut carried thereby adapted to bear on the bifurcated end of the spring-plate to adjust the same, substantially as described.

In testimony whereof I have signed my name to this specification in the presence of two subscribing witnesses.

WILLIAM P. TRACY.

Witnesses:
ABE M. AMBERG,
THOMAS FINN.